United States Patent [19]

Fero

[11] Patent Number: 5,011,650

[45] Date of Patent: Apr. 30, 1991

[54] NUCLEAR POWER GENERATING STATION EQUIPMENT QUALIFICATION APPARATUS

[75] Inventor: Arnold H. Fero, Plum Borough, Pa.

[73] Assignee: Westinghouse Electric Corp., Pittsburgh, Pa.

[21] Appl. No.: 265,066

[22] Filed: Oct. 31, 1988

Related U.S. Application Data

[63] Continuation-in-part of Ser. No. 104,733, Oct. 5, 1987, Pat. No. 4,876,058.

[51] Int. Cl.$^5$ .............................................. G21C 17/00
[52] U.S. Cl. ................................... 376/247; 376/245; 374/159
[58] Field of Search ............... 376/245, 247, 249, 254, 376/202; 73/86; 324/71.2; 340/584, 600; 250/390, 392; 252/962; 374/159, 161, 162

[56] References Cited

U.S. PATENT DOCUMENTS

| | | | |
|---|---|---|---|
| 3,089,958 | 5/1963 | Janner | 250/83.1 |
| 3,809,940 | 5/1974 | Sekella | 313/61 R |
| 3,846,795 | 11/1974 | Jones | 340/421 |
| 3,971,944 | 7/1976 | Quinby | 250/391 |
| 4,069,097 | 1/1978 | Frank | 376/254 |
| 4,079,236 | 3/1978 | Graham et al. | 364/504 |
| 4,097,330 | 6/1978 | Neissel et al. | 376/255 |
| 4,157,277 | 6/1979 | Mormonier et al. | 376/254 |
| 4,167,109 | 9/1979 | Gold | 73/15 R |
| 4,186,048 | 1/1980 | Thomas | 376/254 |
| 4,200,491 | 4/1980 | Ball | 376/254 |
| 4,288,291 | 9/1981 | Cisco et al. | 376/153 |
| 4,318,776 | 3/1982 | Proll et al. | 376/254 |
| 4,404,164 | 9/1983 | Kopp et al. | 376/154 |
| 4,504,437 | 3/1985 | Underwood et al. | 376/153 |
| 4,708,844 | 11/1987 | Kearton et al. | 376/247 |
| 4,829,539 | 5/1989 | Angus et al. | 376/247 |
| 4,842,807 | 6/1989 | Fero et al. | 376/254 |
| 4,844,858 | 7/1989 | Fero et al. | 376/254 |
| 4,876,058 | 10/1989 | Fero et al. | 376/247 |

FOREIGN PATENT DOCUMENTS

| | | |
|---|---|---|
| 612001 | 1/1961 | Canada . |
| 0071350 | 2/1983 | European Pat. Off. ............ 376/247 |
| 0312247 | 4/1989 | European Pat. Off. . |
| 2473775 | 7/1981 | France . |
| 51-15798 | 7/1974 | Japan . |
| 54-103990 | 8/1979 | Japan . |
| 59-102193 | 6/1982 | Japan . |
| 59-203997 | 6/1983 | Japan . |
| 61-110029 | 5/1986 | Japan . |

OTHER PUBLICATIONS

IEEE Std 323-1974, "IEEE Standard for Qualifying Class IE Equipment for Nuclear Power Generating Stations", 2/28/74.
IEEE Std 344-1975 (Revision of IEEE Std 344-1971), "IEEE Recommended Practices for Seismic Qualification of Class IE Equipment for Nuclear Power Generating Stations", 1/31/75.
WCAP-8587, "Methodology", Revision 6-A (NP), Methodology for Qualifying Westinghouse WRD Supplied NSSS Safety Related Electrical Equipment, Mar. 1983.

(List continued on next page.)

*Primary Examiner*—Daniel D. Wasil
*Attorney, Agent, or Firm*—E. F. Possessky

[57] ABSTRACT

Apparatus for monitoring an object piece of qualified equipment in a nuclear power plant includes passive means for detecting a total integrated dose of radiation received by the object piece, means for determining a thermal history of the object piece, and means for housing the passive detection means and determining means in close proximity to the object piece. In order to generate and maintain evidence to assure that qualified equipment used in such stations will operate on demand, the passive detection means and determining means mounted in close proximity to the object piece are exposed to the environment of a normally operating power plant and periodically analyzed to determine whether the qualified life of the object piece may be extended.

19 Claims, 8 Drawing Sheets

OTHER PUBLICATIONS

McLaughlin et al., "Electron and Gamma-Ray Dosimetry Using Radiation-Induced Color Centers in Li F", Technical Paper Presented at Second International Meeting on Radiation Processing, Miami, Florida, Oct. 1978.

Vaughn et al., "Dosimetry Using Optical Density Changes in LiF", Health Physics, vol. 18, (1970), pp. 578-579.

Baeyens et al., "Investigations of the Use of LiF Crystals for Routine High-Level Dosimetry at CERN", IAEA-SM-272/11, pp. 275-283.

K. Törrönen et al., "Reactor Pressure Vessel Radiation Damage Monitoring by Improved Surveillance Programmes", Proceedings of a Symposium held in Vienna, Austria, Jun. 29-Jul. 3, 1987.

G. Fängewisch et al., "Dosimetry with the Aid of the Nuclear Track Method", Kerntechnik vol. 15, No. 5, (May 1973), pp. 207-213.

NUCLEAR POWER GENERATING STATION EQUIPMENT QUALIFICATION APPARATUS

CROSS REFERENCE TO RELATED APPLICATIONS

This application is a continuation-in-part of the application entitled "Nuclear Power Generating Station Equipment Qualification Method and Apparatus", Ser. No. 104,733, filed Oct. 5, 1987, now U.S. Pat. No. 4,876,058, assigned to the assignee of the present invention, and incorporated herein by reference.

BACKGROUND OF THE INVENTION

1. Field of the Invention

This application is related generally to a nuclear power generating station, and more particularly to methods and apparatus for generating and maintaining evidence to assure that qualified equipment used in such stations will operate on demand in order to meet system performance requirements.

2. Statement of the Prior Art

Safety system equipment in nuclear power generating stations is required to be capable of performing satisfactorily under defined conditions, including postulated design basis events such as a loss of coolant accident. It is necessary to provide assurance that such equipment meets its performance requirement throughout its installed life. This is accomplished through a disciplined program of design, qualification, production quality control, installation, maintenance, and surveillance testing.

The process of qualification usually also establishes the qualified lifetime of the equipment. That is the period of time, prior to the start of a design basis event, for which the equipment is demonstrated to meet the design requirements for the specified service conditions. At the end of qualified lifetime, such equipment should be capable of performing the safety functions required for the postulated design basis, and post-design basis events. The qualified lifetime of equipment may be extended if it can be shown that the service or environment conditions originally assumed were overly conservative with respect to those that apply at the equipment's location in its installed configuration. Use of extension methods requires documentation of the program to be followed and auditable records of the results, as illustrated in the IEEE Std 323-1974, "IEEE Standard for Qualifying Class IE Equipment for Nuclear Power Generating Stations", which is incorporated herein by reference.

Gamma ray and beta radiation exposure occurring during normal nuclear power plant operations, or occurring as a result of an accident, can alter the performance of certain equipment such as motors, valve and motor operators, transmitters, indicators, instruments, organic fluids, seals, and electrical insulation. For this reason, equipment qualification includes appropriate exposure to radiation as part of the test procedure. The total radiation dose to which the equipment is exposed in qualification testing depends upon the expected normal radiation environment and the length of time following an accident that the equipment is required to operate.

Nuclear power plant personnel will require a knowledge of the total integrated radiation dose that a piece of equipment has received if it is desired to extend the equipment qualification beyond the present qualified life, or if it is desired to requalify equipment following an accident. In general, the radiation doses used for equipment qualification are sufficiently conservative that, if the actual integrated doses are known, the equipment could continue in service without exceeding the existing qualification envelopes. This is particularly true for an accident where the distribution of radiation levels in the nuclear power plant will vary widely, and be much lower than that assumed for qualification, due to radioactive decay during the release, the physical distribution of radioactive material, and the presence of local shielding in the form of structure, other equipment, floors, and walls.

Previously, nuclear power plant personnel would have very few options with regard to thermal and radiation aging of important equipment. Qualified equipment could be replaced when it reached the end of its qualified lifetime in calendar years without regard to the actual environmental aging; or, nuclear power plant life extension decisions and decisions regarding qualified equipment could be made based upon a projection of very limited active temperature and radiation level measurements. Without measured data, the affected equipment could either be replaced, refurbished, or disassembled, inspected, and reassembled. Major problems with such approaches, however, exist in the time and cost for replacement or refurbishment, as well as considerations affecting qualified equipment vendors and qualified repair parts. Therefore, what is needed is a passive system that provides integrated radiation dose and thermal history throughout normal plant operation, through the duration of a nuclear power plant accident, and beyond.

One such passive system is disclosed and claimed in the above-referenced U.S. Pat. No. 4,876,058. However, the apparatus and methods according to one of the embodiments disclosed and claimed therein required a holder which is not only expensive and difficult to initially fabricate, but is also difficult to service in the field. In addition, it has been found that a much more limited amount of space is available for mounting such passive systems, and that the particular methods for mounting such passive systems were exceedingly difficult.

SUMMARY OF THE INVENTION

Accordingly, it is a general object of the present invention to provide improved methods and apparatus for monitoring qualified equipment installed in a nuclear power plant. More specifically, it is an object of the present invention to provide an improved passive system capable of indicating total integrated dose and thermal history of an object piece of qualified equipment throughout normal nuclear power plant operation, through the duration of a nuclear power plant accident, and beyond.

Another object of the present invention is to provide data to support continued use of qualified equipment following an accident.

Still another object of the present invention is to provide data to support nuclear power plant life/license extension applications.

A further object of the present invention is to provide data to support the proposition that an object piece of qualified equipment has not yet reached the end of its qualified life.

Still a further object of the present invention is to provide data to help avoid potential common cause replacement of aged qualified equipment.

It is yet another object of the present invention to provide data to correlate actual aging observations in equipment.

A further yet object of the present invention is to demonstrate utility management prudence with regard to an integrated equipment surveillance program, pre-planning for nuclear power plant lifetime/license extension (PLEX), and a commitment to post-accident nuclear power plant recovery.

It is also an object of the present invention to provide an improved holder for such passive system in order to accomplish the above-stated objects, such holder being small, relatively inexpensive and easy to fabricate, easy to mount and service in the field, and capable of providing a redundant sealing of the measurement devices contained therein.

Briefly, these and other objects of the present invention are accomplished by apparatus for monitoring an object piece of qualified equipment in a nuclear power plant which includes passive means for detecting a total integrated dose of radiation received by the object piece, means for determining a thermal history of the object piece, and means for housing the passive detection means and thermal history determining means in close proximity to the object piece.

The passive detection means includes first dosimetry means for measuring a gamma ray dose, and second dosimetry means for measuring a beta ray dose. The thermal history determining means includes first monitor means for determining a peak temperature experienced by the object piece, and second monitor means for determining an integrated thermal exposure to the object piece. The housing means consists of an inexpensive, sealed, die-cast aluminum box which is easily riveted to a wide variety of mounting brackets that are conventionally used in nuclear power generating stations. In order to minimize the size of the improved passive system and permit it to be housed within such boxes, the first and second dosimetry means are assembled from injection-molded parts and are self-sealing when so assembled.

A method of monitoring the object piece in accordance with a preferred embodiment includes the steps of mounting such passive detection means and thermal history determining means in close proximity to the object piece, exposing such mounted means to the environment in a normally operating nuclear power plant, and periodically analyzing the first and second dosimetry means and first and second monitor means to determine whether the qualified life of the object piece may be extended. Since an outer portion of the housing means, as well as both of the first and second dosimetry means include encoded indicia, such indicia are also checked in performing the method in accordance with the preferred embodiment to confirm that the correct monitor is being serviced, and to account for the data contained therein.

The above and other objects, advantages, and novel features of the present invention will become more apparent from the following detailed description of the invention when considered in conjunction with the accompanying drawings wherein:

DETAILED DESCRIPTION OF THE INVENTION

Figure 1:
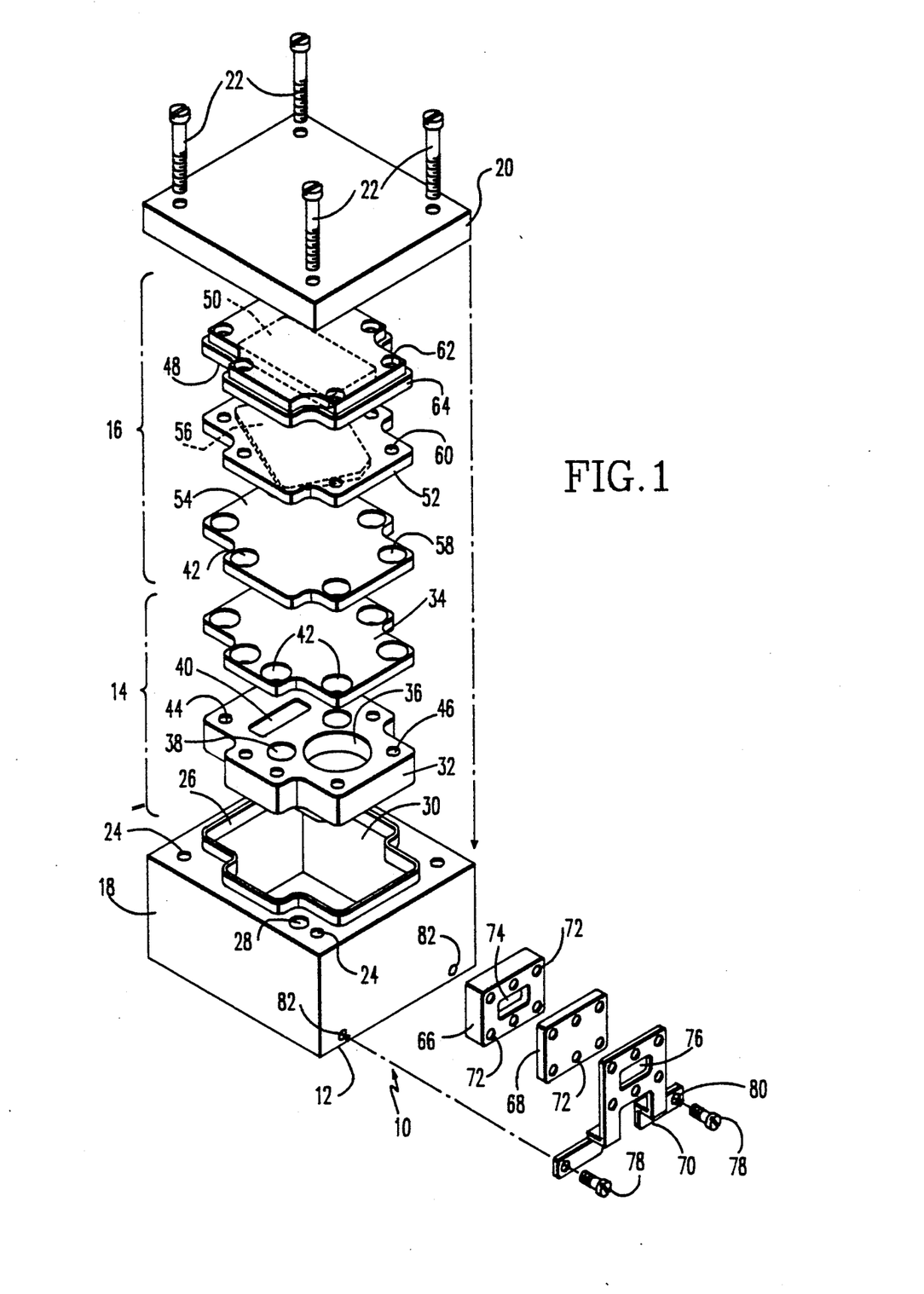
FIG. 1 is an exploded view of an improved monitor according to the present invention.

Referring now to the drawings, wherein like characters refer to like or corresponding parts throughout each of the views, there is shown in FIG. 1 an exploded view of an improved monitor 10 in accordance with the present invention. As is conventional, the monitor 10 is typically mounted within the containment of a nuclear power generating station in close proximity to an object piece of equipment (not shown) which is "qualified", such as equipment that is qualified in accordance with WCAP-8587, Revision 6-A (NP), entitled "Methodology for Qualifying Westinghouse WRD Supplied NSSS Safety-Related Electrical Equipment", approved by the Nuclear Regulatory Commission on Nov. 10, 1983, available to the public from Westinghouse Electric Corporation, Power Systems, Box 355, Pittsburg, Pa. 15230, and incorporated herein by reference.

As is shown in greater detail in FIGS. 2-19, when considered in conjunction with FIG. 1, the monitor 10 is generally comprised of a die-cast aluminum box 12 containing first dosimetry means for measuring a gamma ray dose, and second dosimetry means for measuring a beta ray dose, the first and second dosimetry means together comprising passive means for detecting a total integrated dose of radiation received by the object piece (not shown). Including a body portion 18 and a cover portion 20, the box 12 is substantially corrosion-proofed by essentially excluding any copper from the aluminum alloy used to cast the body portion 18 and cover portion 20. One such suitable box is manufactured by Rose Enclosures of Rockville, Md. as a Type 01.060603.

As is shown in FIG. 1, the cover portion 20 of the box 12 is fitted with a plurality of stainless steel captive screws 22 which are formed to engage corresponding threaded holes 24 in the body portion 18. Sealing of the cover portion 20 to the body portion 18 is provided by a tongue 26 in the body portion 18 for engagement with a correspondingly formed groove (not shown) in the underside of the cover portion 20. Fastening channels 28 are also provided outside of the sealed area comprising a cavity 30 within the body portion 18. Any one of several conventional radiation and temperature resistant seal materials may also be incorporated in a crush seal geometry.

The first dosimetry means consists of a long-term monitor block 14 and a short-term monitor block 16, the component parts of which are formed to fit within the cavity 30 in the body portion 18 of the box 12. Each of the component parts of the long-term monitor block 14 and the short-term monitor block 16 are preferably formed in accordance with a first important aspect of the present invention by injection molding of polyetheretherketone (PEEK), preferably a polyetheretherketone thermoplastic such as Arlon 1000, manufactured by Greene, Tweed Engineered Plastics, Harleysville, Pa.

It has been found that PEEK is the only suitable material which exhibits the required combination of properties of low density, ease of molding, high service temperature, radiation resistance, and resistance to high temperature steam and post-LOCA caustic environments. As is well known, "LOCA" refers to a loss of coolant accident.

Figure 2:
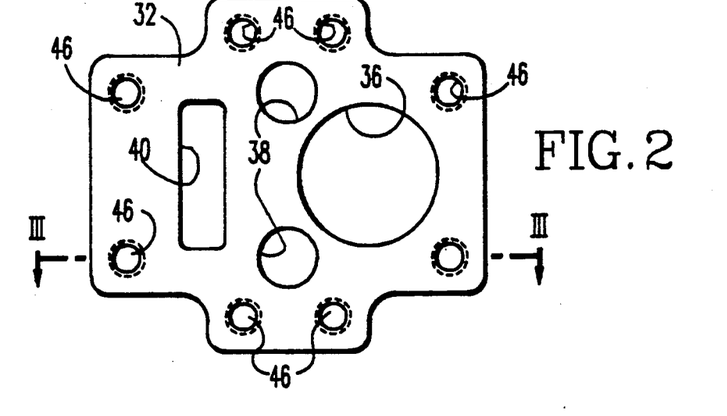
FIG. 2 is a top view of a holder portion of a long-term monitor block in accordance with a first embodiment of the present invention.
Figure 3:
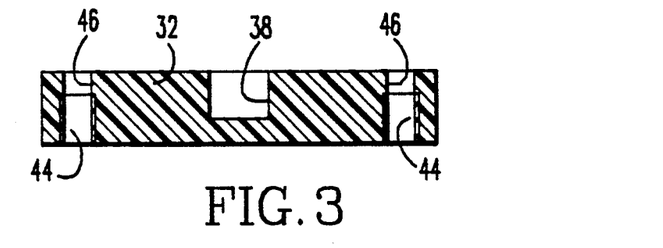
FIG. 3 is a sectional view of the holder portion shown in FIG. 2 taken along the lines 3—3.

Referring now specifically to FIGS. 1-7 and 29, it can be seen that the long-term monitor block 14 comprises a holder portion 32 and a cover plate portion 34. As is shown in FIGS. 2 and 3, the holder portion in accordance with a first embodiment of the present invention includes a large cylindrical cavity 36 for containing a neutron detecting solid state track recorder 150, two smaller cylindrical cavities 38 for containing thermal integrating solid state track recorders 149, and an elongated cavity 40 for containing a plurality of optical crystals 148. Preferably, the elongated cavity 40 is formed to contain at least three lithium fluoride (LiF) optical crystals as are described more particularly in U.S. Pat. No. 4,876,058.

Figure 6:
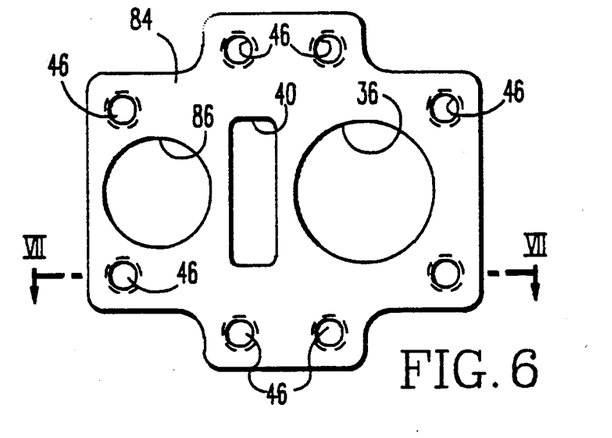
FIG. 6 is a top view of a holder portion of a long-term monitor block in accordance with a second embodiment of the present invention.
Figure 7:
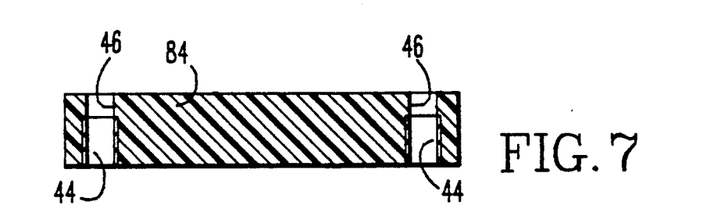
FIG. 7 is a sectional view of the holder portion shown in FIG. 6 taken along the lines 7—7.

Alternatively, and referring now to FIGS. 6 and 7, a holder portion 84 in accordance with a second embodiment of the present invention includes the large cylindrical cavity 36 for containing a neutron detecting solid state track recorder 150, the elongated cavity 40 for containing a plurality of optical crystals 148, and another somewhat smaller cylindrical cavity 86 for containing another neutron detecting solid state track recorder. In accordance with this second embodiment of the present invention, the cavities 36 and 86 are differently sized because the neutron detecting solid state track recorder which is adapted to be contained in cavity 36 is cadmium shielded, while the other neutron detecting solid state track recorder that is adapted to be contained in cavity 86 is bare.

Figure 4:
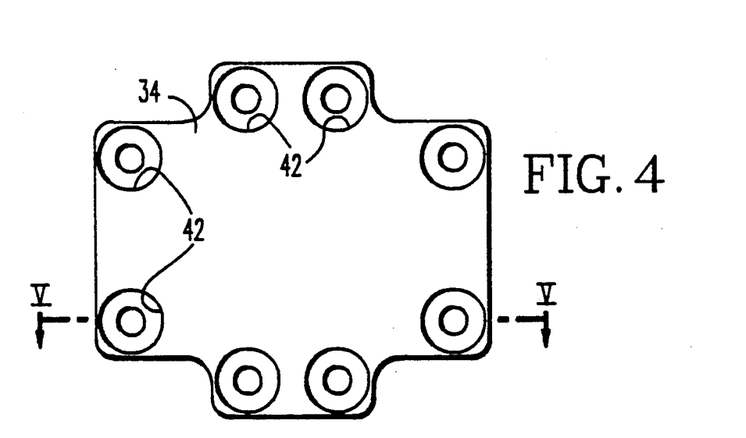
FIG. 4 is a top view of a cover plate portion of the long-term monitor block.
Figure 5:
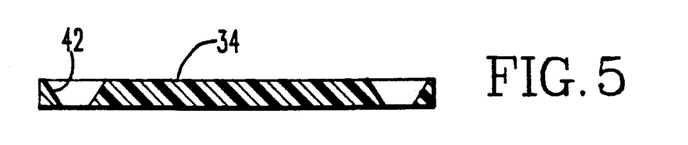
FIG. 5 is a sectional view of the cover plate portion shown in FIG. 4 taken along the lines 5—5.

The cover portion 34 shown in FIGS. 4 and 5 is adaptable for covering either of the holder portions 32 or 84, and includes a plurality of countersunk holes 42 which are adapted to receive means such as conventional flat head, hex-socket cap screws (not shown) for joining such cover portion 34 to the holder portion 32 or 84. Correspondingly located holes 44 are formed in the holder portion 32 or 84 and are provided with stainless steel threaded inserts 46 for receiving the cap screws (not shown).

Referring now specifically to FIGS. 1, 8-15 and 29, it can be seen that the short-term monitor block 16 comprises a first holder portion 48 having a large rectangular cavity 50 formed therein which is adapted to contain one or more conventional peak temperature monitors 145, a second holder portion 52, and a cover plate portion 54. The second holder portion 52 also includes a large rectangular cavity 56 which is adapted to contain one or more conventional thermoluminescent dosimeters 146. In accordance with a second important aspect of the present invention, the cavity 56 formed in the second holder portion 52 is formed so as to be capable of containing the thermoluminescent dosimeters 146 in a conventional aluminum Harshaw card 147.

Figure 8:
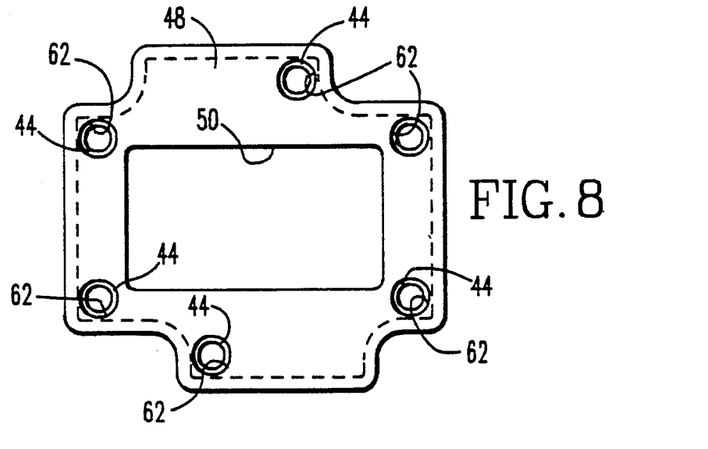
FIG. 8 is a top view of a first holder portion of a short-term monitor block in accordance with a first embodiment of the present invention.
Figure 9:
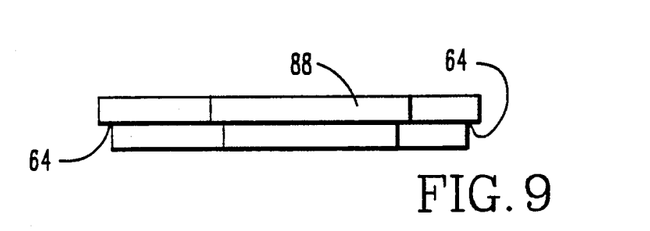
FIG. 9 is a side view of the first holder portion shown in FIG. 8.
Figure 10:
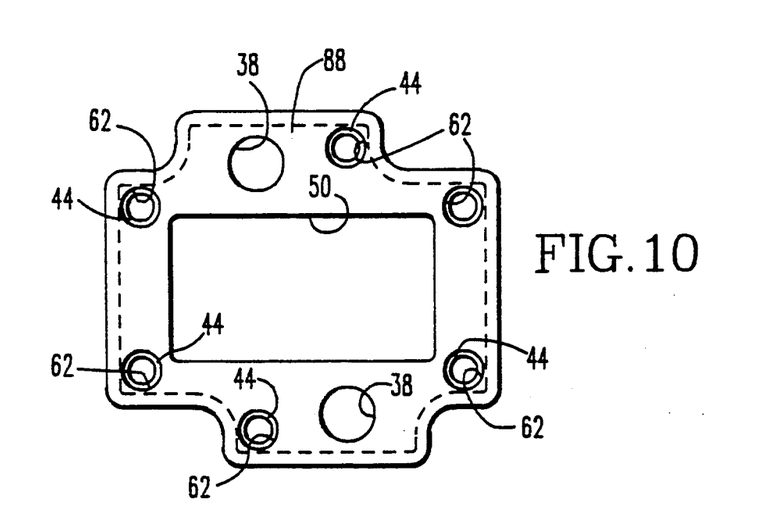
FIG. 10 is a top view of a first holder portion of a short-term monitor block in accordance with a second embodiment of the present invention.

As shown in FIGS. 8 and 9, the first holder portion 48 is adapted to contain only the peak temperature monitors within cavity 50. However, in accordance with the second embodiment of the present invention where the holder portion 84 of the long-term monitor block 14 is used, an alternative first holder portion 88 is employed to accommodate two thermally integrating solid state track recorders 149 in a pair of small cylindrical cavities 38 as shown in FIG. 10.

Figure 11:
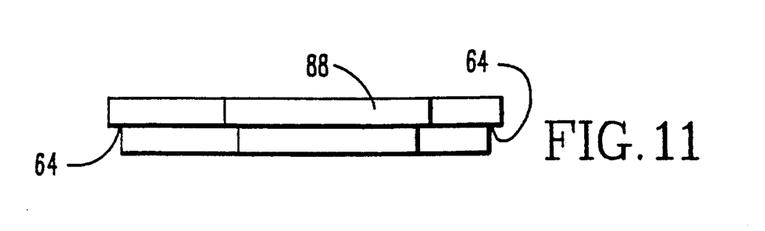
FIG. 11 is a side view of the first holder portion shown in FIG. 10.
Figure 12:
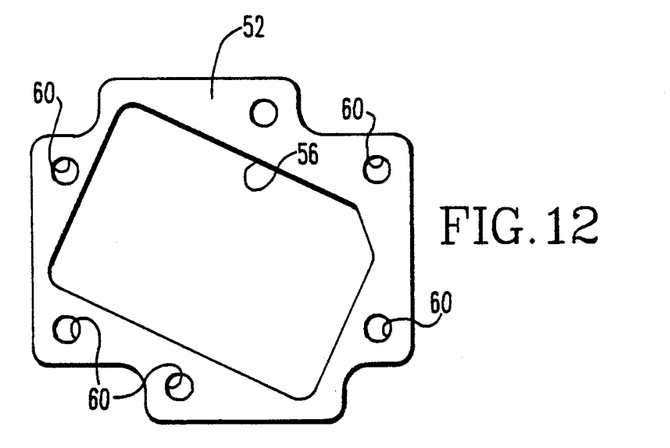
FIG. 12 is a top view of a second holder portion of the short-term monitor block.
Figure 13:
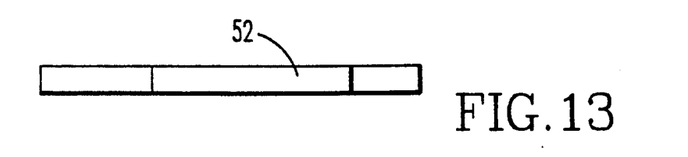
FIG. 13 is a side view of the second holder portion shown in FIG. 12.
Figure 14:
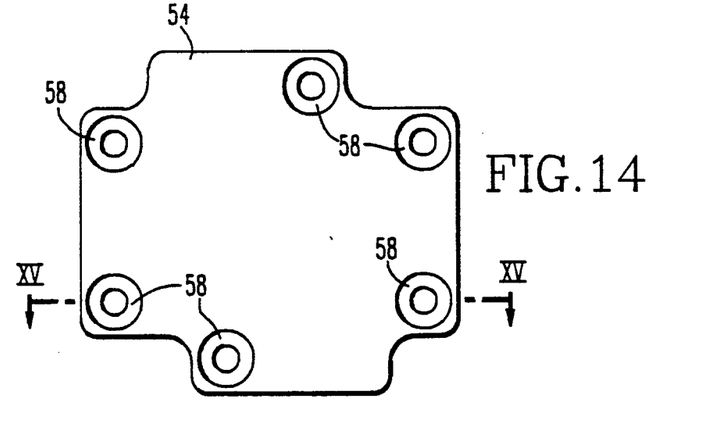
FIG. 14 is a top view of a cover plate portion of the short-term monitor block.
Figure 15:
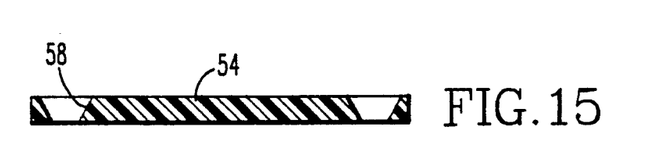
FIG. 15 is a sectional view of the cover plate portion shown in FIG. 14 taken along the lines 15—15.
Figure 16:
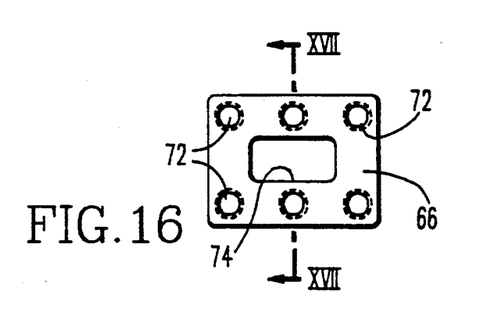
FIG. 16 is a top view of a block portion of a beta dosimeter assembly in accordance with the present invention.
Figure 17:
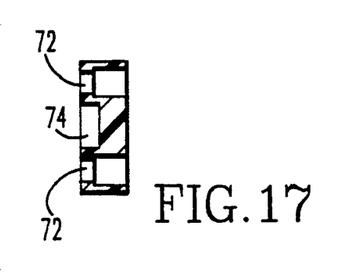
FIG. 17 is a sectional view of the block portion shown in FIG. 16 taken along the lines 17—17.
Figure 18:
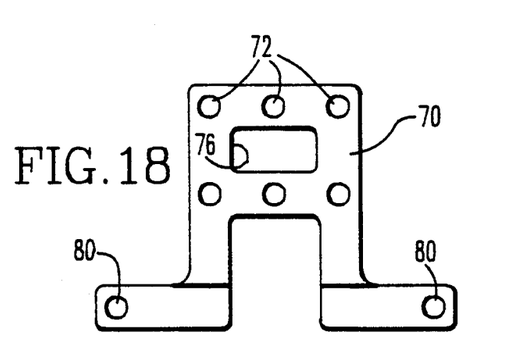
FIG. 18 is a front view of a holder portion of the beta dosimeter assembly in accordance with the present invention.
Figure 19:
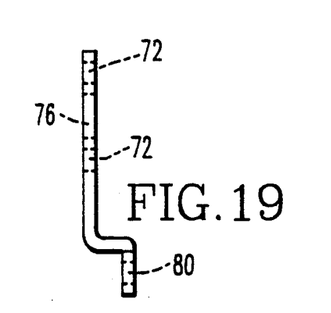
FIG. 19 is a side view of the holder portion shown in FIG. 18.

The short-term monitor block 16 is, as shown in FIG. 1, assembled by first inserting the various detection means within their respective cavities, and second sandwiching the second holder portion 52 between the first holder portion 48 and the cover plate portion 54. The cover plate portion 54 shown in FIGS. 14 and 15 is adaptable for use with either of the first holder portions 48 or 88, as well as the second holder portion 52, and includes a plurality of countersunk holes 58 which are adapted to receive means such as the conventional flat head, hex-socket cap screws (not shown) referred to herein above for joining such cover plate portion 54 to the first holder portions 48 or 88 and the second holder portion 52. Correspondingly located holes 44 are formed in the first holder portion 48 or 88 and are provided with stainless steel threaded inserts 62 for receiving the cap screws (not shown), via correspondingly located holes 60 in the second holder portion 52. As is shown in FIGS. 9 and 11, both of the first holder portions 48 and 88 include a shoulder 64 that is formed about their peripheries to accommodate such holder portions 48 and 88 within the cover portion 20 of the box 12.

Referring now to FIGS. 16–19 in conjunction with FIG. 1, it can be seen that the second dosimetry means comprises a beta dosimeter assembly including a beta block 66, a thin (e.g., approximately 0.001 inch thick and less than 20 mg/cm$^2$) stainless steel foil beta window 68, and a holder portion 70. The beta dosimeter assembly consisting of the beta block 66, beta window 68, and holder portion 70 is held together in a sealed relationship by screws (not shown) threaded through holes 72 bored in the beta block 66, beta window 68, and holder portion 70. As is conventional, the holes 72 formed in the beta block 66 may be threaded, or the beta dosimeter assembly may be fastened together with stainless steel blind rivets (not shown).

Two LiF optical crystals 148 are placed within a cavity 74 that is formed in the beta block 66, such that they may be exposed to beta and low energy gamma ray radiation through the beta window 68 and a hole 76 formed in the holder portion 70. In such a manner, the beta/low energy gamma ray dose may be obtained by conventional subtraction techniques since the higher energy gamma ray radiation is measured by the LiF optical crystals contained within the long-term monitor block 14. A pair of screws 78 conveniently retain the beta dosimeter assembly against a side of the box 12, threaded through holes 80 formed in the holder portion 70 into corresponding threaded holes 82 in the box 12.

The LiF optical crystals comprise color-center formation means. Ionizing radiation, as is well known, produces relatively stable color-centers in lithium fluoride, and the values of the optical absorbance of the maxima of the resulting absorption bands can be measured at a plurality of discrete wavelengths. The principle of color-center formation as a radiation dosimeter involves exposure to ionizing radiation which results in trapped electrons in negative ion vacancies in the lattice. These trapped electrons are responsible for the optical absorbance phenomenon known as "color-centers".

As is well known, a series of color-centers are developed in lithium fluoride with increasing radiation dose. See, for example, "Electron and Gamma-Ray Dosimetry Using Radiation-Induced Color Centers in LiF", McLaughlin, a technical paper presented at the Second International Meeting on Radiation Processing, Miami, Fla. 1978. By utilizing absorption bands corresponding to different types of color-centers, an absorbed dose range from $10^3$ to $10^{10}$ rads can be covered, with response regions overlapping at the doses of change-over from one to the other center.

The production of each type of color-center is initially proportional to absorbed dose, and then gradually tends towards saturation. Each of the LiF optical crystals is read by measuring the amount of optical absorbance at wavelengths which correspond to the various color-centers of interest. This measurement may be made using any commercially available UV-Vis spectrophotometer, with one suitable such spectrophotometer being made by Varian Instrument Division, Sunnyville, Calif. as the model TMS 200.

The amount of optical absorbance determined by the spectrophotometer is then compared to a calibration curve to determine the absorbed dose. It should be noted at this juncture that such reading of the LiF optical crystals does not alter the color-centers themselves. Therefore, each LiF optical crystal constitutes a rereadable permanent record. A presently preferred form for the lithium fluoride dosimeter is as a cleaved lithium fluoride crystal that is commercially available from the Harshaw Chemical Company, Solon, Ohio.

The thermoluminescent dosimetry means comprises in a presently preferred embodiment at least one conventional manganese activated calcium fluoride thermoluminescent dosimeter capable of providing gammaray dose information below approximately $10^5$ rads. On the other hand, the neutron detecting solid state track recorders consist of reusable deposits of fissionable material on high purity nickel backing disks in surface contact with replaceable mica. As is known, neutron-induced fission in isotopes of uranium, plutonium, and neptunium produces latent fission-fragment tracks in the SSTR. Such tracks are developed by chemical etching to a size that is observable with an optical microscope for track counting. Both bare and cadmium-shielded isotopes of U-235 and Pu-239 may be used, as well as cadmium-shielded U-238 and Np-239.

The peak temperature monitors are preferably comprised of conventional monitors that irreversibly turns black when an indicated peak temperature is reached. One suitable such type of monitor is the "Omegalabel" temperature labels manufactured by Omega Engineering, Incorporated, Stamford, Conn.

On the other hand, the thermal integrating solid state track recorders may comprise any such means that is adapted for use as integrating thermal monitors. As is well known, solid state track recorders which have been exposed to a fission source contain a known number of fission fragment tracks. These tracks are damaged areas that can be chemical etched to an observable size for optical or spark counting. Such damaged zones are self-repairing by annealing upon exposure of the solid state track recorder to elevated temperatures. The rate and amount of repair is a function of the material and the time at temperature and may be characterized by an Arrhenius function of temperature. One such process for measuring temperature with solid state track recorders is disclosed in U.S. Pat. No. 4,167,109, issued Sept. 11, 1979 to Gold.

According to Gold, mica or quartz track detectors may be used to measure temperature by first exposing the track detector to a known number of fission fragments, placing the track detector in an unknown temperature environment for a length of time T, and measuring the track dimetral change or change in number of tracks observed. As is known, the loss in tracks is a function of temperature and time of exposure. Since the temperature dependency is quite short, in general all tracks will be removed or amended within a very short time if T is greater than $T_0$, and none will be removed if T is less than $T_0 - T$. Only in the region between $T_0 - T$ and $T_0$ will fairly precise definition of exposure temperature occur. The temperature $T_0$ for typical track detector materials has only a few values which do not necessarily correspond to temperature in a desired measurement range for applications with the monitor 10.

Since $T_0$ in general related closely to the melting point of the track detector, use of various plastic and glass types with different melting points will provide a range of temperatures to satisfy almost any need. Once a specific type of plastic or glass is calibrated, for response to temperature and annealing, the degree of accuracy of the temperature measurement averaged over time can be ascertained.

A method of monitoring the object piece of equipment which utilizes apparatus in accordance with the monitor 10 includes the steps of mounting the above described passive detection means and thermal history determining means in close proximity to the object piece, exposing such mounted means to the environment of a normally operating nuclear power plant, and periodically analyzing the passive detection means and thermal history determining means to determine whether the qualified life of the object piece may be extended.

Figure 20:
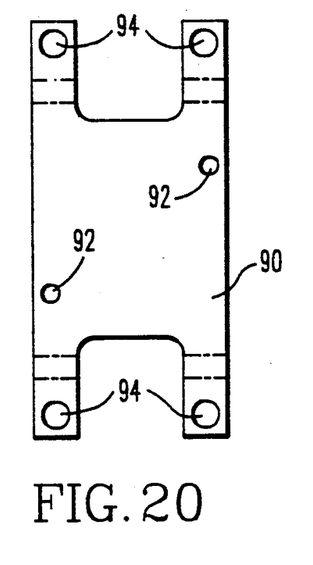
FIG. 20 is a front view of a mounting bracket used to mount the improved monitor in accordance with a first embodiment of the present invention.
Figure 21:
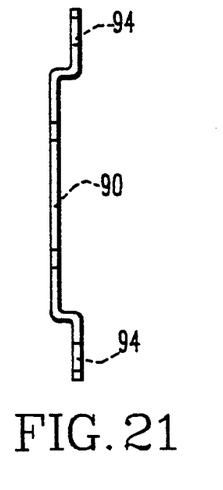
FIG. 21 is a side view of the mounting bracket shown in FIG. 20.

Referring now to FIGS. 20-27, there is shown a variety of mounting means suitable for use with the monitor 10. One mounting bracket 90 is shown in FIGS. 20 and 21, and is suitable for mounting the monitor 10 directly to a surface such as mirror insulation or a cubicle wall in a nuclear power generating station. The mounting bracket 90 preferably comprises a piece of 16-gauge stainless steel sheet which is cut to form and bent as shown. A pair of holes 92 suitably sized for conventional attachment means such as blind rivets are punched or drilled in the sheet 90 at positions which correspond to the fastening channels 28 (FIG. 1) formed in the body portion 18 of the box 12. A plurality of holes 94 are likewise provided to attach the mounting bracket 90 coupled to the monitor 10 directly to the surface by means such as screws (not shown).

Because of the widespread use in nuclear power generating stations of an all purpose metal framing channel known as UNISTRUT ®, the mounting means that is shown in FIGS. 22-27 is specifically adapted for use with such UNISTRUT ® channeling. The mounting bracket 96 shown in FIG. 22, for example, is preferably formed of 16-gauge stainless steel sheet and includes a pair of holes 98 for use in the same manner as the holes 92 in the mounting bracket 90. Another pair of holes 100 is provided at an interval that is adapted for bolting of the mounting bracket 96 (with the monitor 10 attached thereto) to the UNISTRUT ® channeling.

Figure 22:
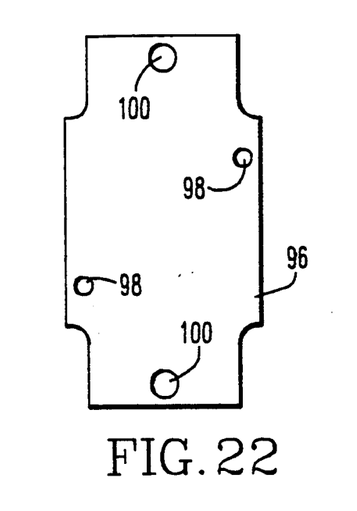
FIG. 22 is a front view of a mounting bracket used to mount the improved monitor in accordance with a second embodiment of the present invention.
Figure 23:
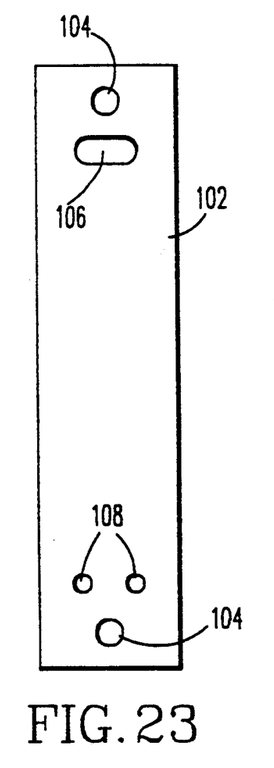
FIG. 23 is a front view of a first portion of a mounting bracket used to mount the improved monitor in accordance with a third embodiment of the present invention.
Figure 24:
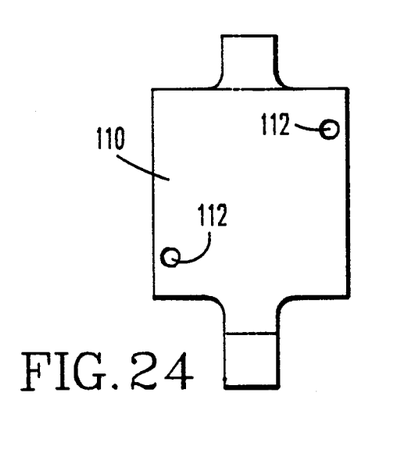
FIG. 24 is a front view of a second portion of the mounting bracket in accordance with the third embodiment of the present invention.

In an environment of high-radiation, mounting means that is specifically adapted for quick service is shown in FIGS. 23-27. A first portion 102 (FIG. 23) of a mounting bracket that is adapted for such quick service includes a pair of holes 104 which, like the holes 100 of FIG. 22, are provided at an interval that is adapted for bolting of the first portion 102 to the UNISTRUT ® channeling. An elongated hole 106 and a pair of small holes 108 are also provided to interact in conjunction with a second portion 110 (FIGS. 24 and 25) of the mounting bracket and a conventional compression spring catch 114 FIGS. 26 and 27) as is explained in greater detail herein below.

Figure 25:
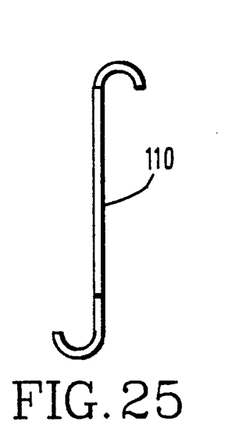
FIG. 25 is a side view of the second portion of the mounting bracket shown in FIG. 24.
Figure 26:
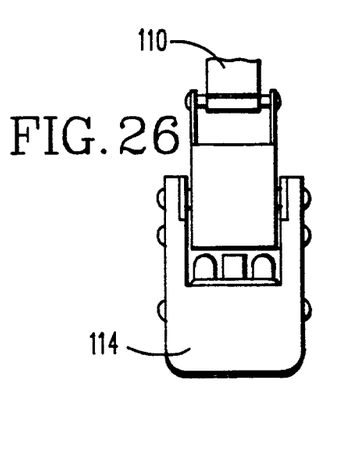
FIG. 26 is a front view of a compression spring catch that is used in conjunction with the first and second portions of the mounting bracket in accordance with the third embodiment of the present invention.
Figure 27:
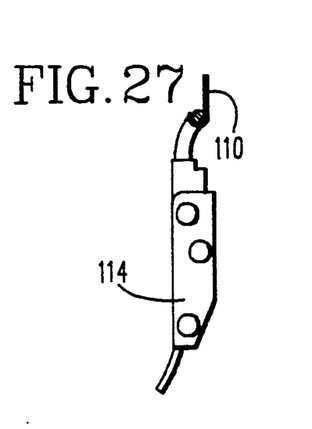
FIG. 27 is a side view of the compression spring catch shown in FIG. 26.

The second portion 110 of the mounting bracket according to this embodiment of the present invention is also preferably comprised of 16-gauge stainless steel formed in a substantially S-shape as shown in FIG. 25 so that an upper "hook" of the second portion 110 is adapted to be engaged to the hole 106 in the first portion 102 of the mounting bracket. A lower "hook" of the second portion 110 is likewise adapted to be engaged to the crossbar portion of the compression spring catch 114 as shown in FIGS. 26 and 27.

While the particular separation of the hole 106 from the pair of holes 108 depends upon the pulling force of the compression spring catch 114 employed (i.e., the greater the force of the compression spring catch, the greater is such separation), one suitable such compression spring catch 114 is the No. HC 83314-42-LALB-SS catch that is manufactured by Nielsen Hardware Corp. of Hartford, Conn.

Figure 28:
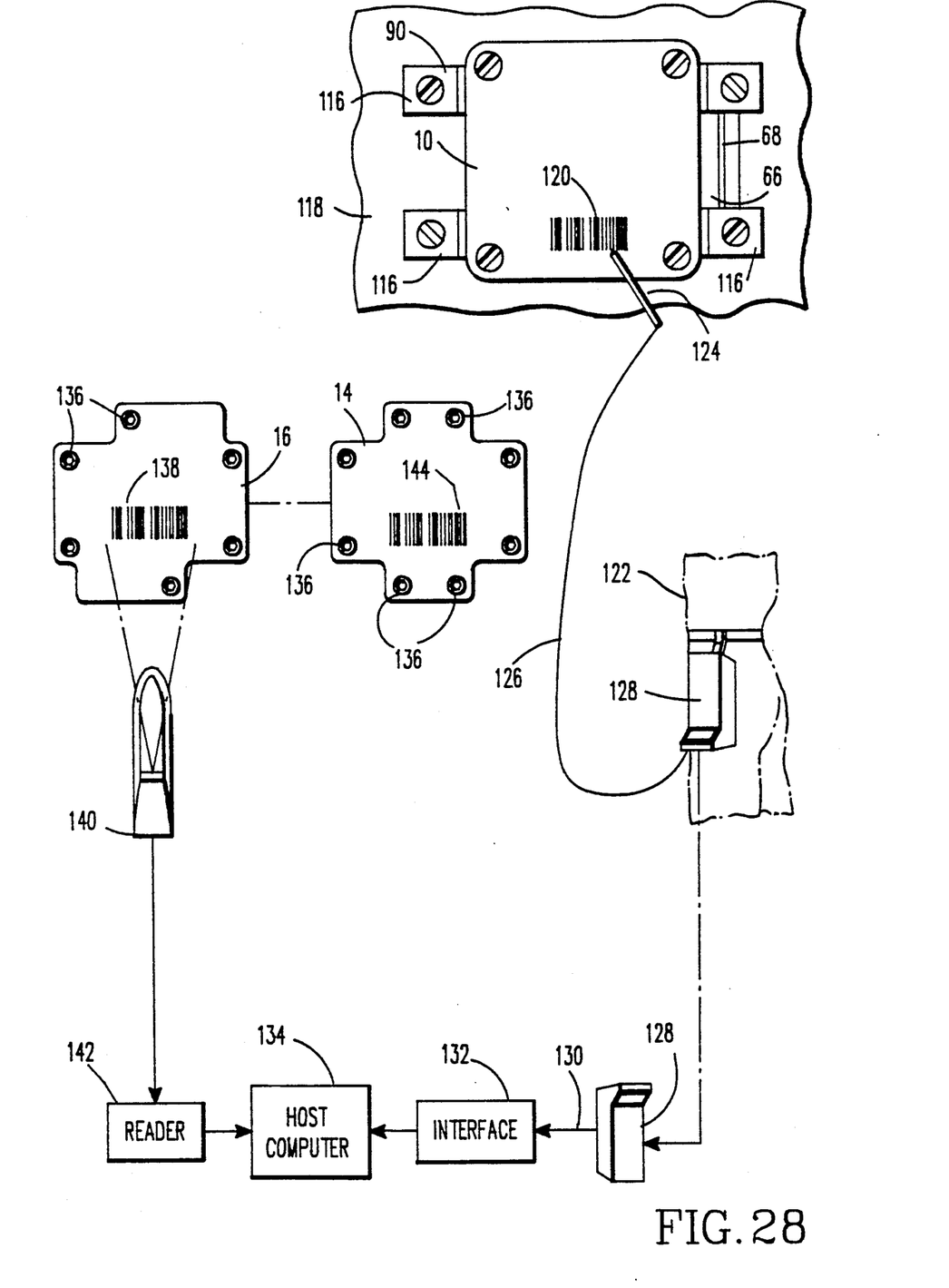
FIG. 28 is a block diagram that illustrates the method according to the present invention.
Figure 29:
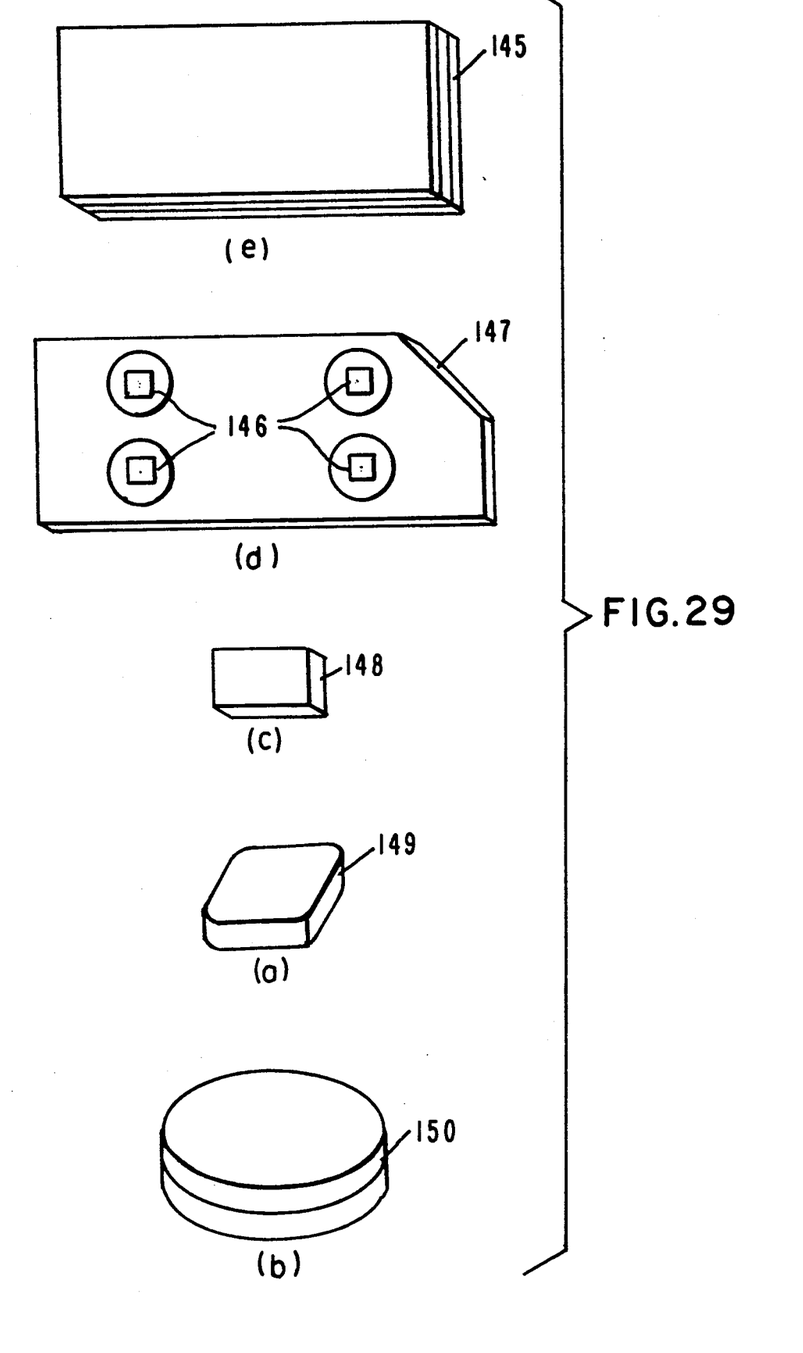
FIG. 29 comprises schematic representations of (a) a thermal integrating solid state track recorder, (b) a neutron detecting solid state track recorder, (c) a lithium fluoride optical crystal, (d) four thermoluminescent dosimeters contained in a card, and (e) peak temperature monitors.

Referring now to FIG. 28, there is shown a monitor 10 that is mounted in close proximity to an object piece in a nuclear power generating station. The monitor 10 is shown attached to the mounting bracket 90 which is, in turn, attached by a plurality of screws 116 to a wall. An encoded label 120 (e.g., a bar-coded label as shown) is affixed to the monitor 10 for identification thereof.

The encoded label 120 is first scanned by a worker 122 by any conventional means such as an infrared bar code scanning wand 124. In one possible embodiment of the present invention, the wand 124 is connected by a flexible cord 126 to a bar code reader 128 which is, for example, carried on the worker's belt. A suitable such infrared bar code scanning wand 124 and bar code reader 128 is manufactured by Intermec of Lynnwood, Wash. as their Models 1236 and 9410 respectively.

Thereafter, the data thusly read is stored by the reader 128 until, at a subsequent time, it is connected by way of a multiple conductor cable 130 to an interface 132, such as the Model 9401 that is also manufactured by Intermec, which utilizes conventional RS-232C interface protocol to transmit the data to a host computer 134 for analysis.

A second method of inputting data is substantially similar to the method described immediately herein above, but employs a hand-held laser scanner 140 such as the Model 1600 that is also manufactured by Intermec. As is also shown in FIG. 28, the scanner 140 is used to scan encoded labels 138, 144 affixed respectively to the short-term monitor block 16 and long-term monitor block 14. This method has several advantages, mainly in that no physical contact is required between the scanner 140 and the encoded label 138 or 144.

As a rule, however, it would be undesirable to have two different scanners in use. In any case, the scanner 140 is conventionally connected to a suitable reader 142 (such as the Intermec Model 9500) that is also connected by way of an RS-232C interface for communication of the data to the host computer 134.

According to a periodic inspection routine, the worker 122 would merely remove the cover portion 20 of each monitor 10 after having verified the identification of that monitor 10 by scanning the encoded label 120 as described above. Once the cover portion 20 of the box 12 had been so removed, the worker would similarly scan in turn the encoded label 138 of the short-term monitor block 16 followed by the encoded label 144 of the long-term monitor block 14.

One, or both, of the inspected and scanned monitor blocks 14 and 16 would then be replaced with new such monitor blocks 14 or 16, and the encoded labels 138, 144 of such new monitor blocks 14, 16 would also be scanned to verify their proper replacement. An encoded label (not shown) could also be placed on the beta dosimeter assembly consisting of the beta block 66 and beta window 68 such that the beta dosimeter assembly could likewise be periodically scanned, inspected and replaced.

Upon visual examination, if the lid seal (not shown) between the body portion 18 and the cover portion 20 of the box 12 showed any sign of deterioration, a replacement cover portion 20 with a new seal could be installed by the worker 122. The old cover portion 20 would then be refurbished with a new seal and returned to a spares inventory. It should also be noted at this juncture that all of the component parts of the monitor 10, because of their selected sizes and materials, can be readily decontaminated.

The advantages afforded by the apparatus in accordance with the present invention include ease of manufacture, assembly, handling and marking. A combination of the relatively thin (i.e., approximately 0.1 inch thick) aluminum enclosure and the mass of the PEEK not only effectively shields the LiF optical crystals and thermoluminescent dosimeters from external beta radiation fields, but it also minimizes the generation of Bremsstrahlung radiation through the utilization of low atomic number materials. Such low atomic materials also minimize attenuation of neutron and gamma ray radiation, thereby simplifying calibration. Moreover, the various monitor blocks serve to establish electron equilibrium conditions which satisfy requirements of Bragg-Gray small cavity theory, and the overall mass of the materials used provides some thermal inertia which reduces any undesirable sensitivity to brief thermal spikes in the environment.

Obviously, many modifications are possible in light of the above teachings. It should be understood, therefore, that within the scope of the appended claims, the present invention may be practiced otherwise than as specifically described herein.

I claim as my invention:

1. In a nuclear power plant having an object piece of qualified equipment, an apparatus for monitoring said object piece of qualified equipment, comprising:
   (a) passive means for detecting a gamma ray does of radiation received by the object piece;
   (b) means for determining a thermal history of the object piece;
   (c) means for detecting neutron-induced fission;
   (d) a plurality of monitor blocks, said gamma ray detection means, said thermal history determining means and said fission detection means enclosed in one of said monitor blocks, each of said monitor blocks having first sealing means for individually sealing said each monitor block; and
   (e) means for housing said monitor blocks in close proximity to the object piece, said housing means having a body portion and a cover portion, a cavity being formed in said body portion and said monitor blocks being disposed in said cavity.

2. The apparatus according to claim 1 wherein said first sealing means comprises a cover plate for each of said monitor blocks.

3. The apparatus according to claim 2 wherein each of said monitor blocks comprises at least one holder portion, each of said cover plates being joined to one of said holder portions of each of said monitor blocks.

4. The apparatus according to claim 3 wherein each of said holder portions and each of said cover plates is formed by injection molding a polyetheretherketone.

5. The apparatus according to claim 3 further comprising second sealing means for sealing said cover portion of said housing means to said body portion of said housing means.

6. The apparatus according to claim 3, wherein
   (a) said gamma ray detection means comprises color-center formation means and thermoluminescent dosimetry means; and
   (b) said thermal history determining means comprises means for determining a peak temperature and means for determining an integrated thermal exposure.

7. The apparatus according to claim 6, wherein said plurality of monitor blocks comprises a first monitor block, said first monitor block has a first holder portion, said first holder portion has first, second and third cavities formed therein, said first, second and third cavities being adapted to hold said fission detecting means, said color-center formation means and said integrated thermal exposure determining means, respectively.

8. The apparatus according to claim 6 wherein said plurality of monitor blocks comprises a second monitor block, said second monitor block has second and third holder portions, each of said second and third holder portions has a cavity formed therein, said cavity in said second holder portion adapted to hold said peak temperature determining means, said cavity in said third holder portion adapted to hold said thermoluminescent dosimetry means.

9. The apparatus according to claim 8 wherein said cover plate of said second monitor block and said second holder portion are joined to said third holder portion.

10. The apparatus according to claim 6 further comprising a bar coded label on said cover portion of said housing means of each of said monitor blocks.

11. The apparatus according to claim 6, wherein:
   (a) said color-center formation means comprises a plurality of lithium fluoride optical crystals;
   (b) said thermoluminescent dosimetry means comprises a plurality of manganese-activated calcium fluoride thermoluminescent dosimeters;
   (c) said fission detecting means comprises at least one first solid state track recorder, said first solid state tract recorder having a fissionable material in contact with a mica disk; and
   (d) said integrated thermal exposure determining means comprises a plurality of second solid state track recorders, each of said second solid state track recorders having been pre-exposed to a fission source.

12. The apparatus according to claim 1 further comprising means for measuring a beta ray dose, said beta ray dose measuring means affixed to an exterior surface of said body portion of said housing means.

13. The apparatus according to claim 12 wherein said beta ray dose measuring means comprises:
   (a) a beta block, a cavity formed in said beta block, said cavity adapted to hold a lithium fluoride optical crystal;
   (b) a beta window; and
   (c) a fourth holder portion, said fourth holder portion having means for securing said beta block and said beta window to said exterior surface of said body portion of said housing means.

14. The apparatus according to claim 13 further comprising a bracket affixed to said body portion of said housing means, said bracket having means for mounting said housing means in close proximity to said object piece of qualified equipment.

15. The apparatus according to claim 14 wherein said bracket is comprised of:
(a) a compression spring catch;
(b) a first member, said first member having means for being mounted in close proximity to said object piece of qualified equipment, said first member having means for attaching said compression catch thereto, said first member having a hole formed therein; and
(c) a second member, said second member having first and second ends, a hook being formed on each of said ends, said hook formed on said first end adapted to engage said hole in said first member, said hook formed on said second end adapted to engage said compression spring catch.

16. The apparatus according to claim 6 wherein said plurality of monitor blocks comprises first and second monitor blocks, said first monitor block has first, second and third cavities formed therein, said first and second cavities adapted to hold said fission detecting means, said third cavity adapted to hold said color-center formation means.

17. The apparatus according to claim 16 wherein said second monitor block has second and third holder portions, said second holder portion has fourth and fifth cavities formed therein, said fourth cavity adapted to hold said integrated thermal exposure determining means, said fifth cavity adapted to hold said peak temperature determining means, said third holder portion has a sixth cavity formed therein, said sixth cavity adapted to hold said thermoluminescent dosimetry means.

18. In a nuclear power plant having a piece of qualified equipment and an apparatus for monitoring the thermal environment and radiation to which said object piece of qualified equipment is exposed, a housing for said monitoring apparatus, comprising:
(a) a body portion, said body portion having a cavity formed therein, a bracket being affixed to said body portion;
(b) a cover portion, means for joining said cover portion to said body portion;
(c) means for sealing said cover portion to said body portion; and
(d) a plurality of monitor blocks, each of said monitor blocks disposed in said cavity in said body portion, each of said monitor blocks having at least one holder portion and a cover plate, each of said holder portions having at least one cavity formed therein, each of said cover plates forming a seal for its respective holder portion.

19. The housing according to claim 18 wherein:
(a) said body portion and said cover portion are formed by casting an aluminum alloy essentially free of any copper; and
(b) each of said holder portions and cover plates are formed by injection molding a polyether-etherketone to conform to the shape of said cavity in said body portion.

* * * * *